United States Patent [19]

Goedecke et al.

[11] Patent Number: 4,538,643

[45] Date of Patent: Sep. 3, 1985

[54] ELECTROPNEUMATIC PILOT CONTROL STAGE FOR A PNEUMATIC SERVO VALVE

[75] Inventors: Wolf-Dieter Goedecke, Unterkirnach; Gerhard Schneckenburger, Hüfingen; Reinhard Schwenzer, Aachen, all of Fed. Rep. of Germany

[73] Assignee: Kienzle Apparate GmbH, Villingen, Fed. Rep. of Germany

[21] Appl. No.: 501,986

[22] Filed: Jun. 7, 1983

[30] Foreign Application Priority Data

Jun. 11, 1982 [DE] Fed. Rep. of Germany ....... 3221928

[51] Int. Cl.³ .................... F16K 31/12; F16K 31/02
[52] U.S. Cl. .................. 137/625.64; 251/65; 251/129.15
[58] Field of Search ............. 137/625.64; 251/65, 251/129

[56] References Cited

U.S. PATENT DOCUMENTS 2,521,854  7/1970  Leiber et al. .................... 251/129
3,021,866  2/1962  Handley .......................... 251/65
3,457,956  7/1969  Andrews .......................... 251/129

Primary Examiner—John J. Camby
Attorney, Agent, or Firm—Toren, McGeady, Stanger, Goldberg & Kiel

[57] ABSTRACT

Electropneumatic pilot or anticipatory control stage for a pneumatic servo valve includes a nozzle impact plate system, with an impact plate (9,23) controlled by a plunger coil (7) by the input of electric signals. Openings (58,61,62) are arranged in a diaphragm spring disk (10) serving as carrier element for the plunger coil (7), as well as in the front flange (65) of the coil body (8), these openings (58,61,62) guide a flow of air (64) passing through a measuring nozzle (22) of the valve main stage (2) into the pilot control state (1) through a magnetic gap or space (66,67) about the plunger coil (7) and conduct the air into the atmosphere via exhaust ducts (63). By means of the work medium inherent to the servo valve, a permanent cooling of the plunger coil (7) is effected. The automatic control valve affords miniaturization and the improvement of the valve dynamics for better integration in pneumatic drives.

9 Claims, 3 Drawing Figures

ELECTROPNEUMATIC PILOT CONTROL STAGE FOR A PNEUMATIC SERVO VALVE

SUMMARY OF THE INVENTION

The invention is directed to the electropneumatic pilot or anticipatory control stage for controlling a pneumatic servo valve for a pneumatic drive system with a nozzle impact plate system having an impact plate controllable in connection with a plunger coil in the area of the magnetic field through the input of electrical signals.

An electropneumatic servo valve is a mechanism for controlling the flow of air or air pressure through the main stage of a pneumatic valve proportional relative to the input of electric signals in a so-called electropneumatic automatic control stage. An electric or electronic control system is preferred because one can better master the performance requirements with respect to a flexible dynamic controllability and these requirements are superior in many respects to the mechanical or purely fluid systems. In an electropneumatic pilot control stage, the aim is to assign a clearly definable, corresponding pressure or a flow volume, at the outlet of the valve main stage or of the pneumatic servo valve, based on a determined electric input signal at the pilot control stage. Finally, to obtain a high amplification effect from an electropneumatic converter of the designated type, one depends on making controllable the highest possible flow volume with the smallest possible electric output on the input side of the valve in proportional dependence or to make controllable the effect of large pressures. To create the preconditions for this, all influencing variables with respect to structural component parts and combinations of control elements in known valves of this type must be examined and possibly matched in an optimum manner. One of the main characterizing features for an optimum strengthening effect is surely found in the electric power consumption, which, while retaining the pneumatic valve capacity, is to be reduced to the extent that one can employ correspondingly constructed valves in the range of the frequently prescribed inherent safety or as computer controlled valves, because of a relatively minimum electric power consumption.

Other influencing conditions, basic to the user, result from the structural conception of the electropneumatic servo valve. Here, one must pay particular attention to steps which, without dispensing with a part of the valve output, lead to a miniaturization of the structural components and, in particular, of the electropneumatic pilot control stage. A first requirement involves constructive steps for achieving the smallest possible structural dimensioning, which steps serve to better integrate servo valves constructed in this manner, e.g., in housings of pneumatic drive systems. It is very important that the total valve be of a light weight and, in this context, that there be few moving parts in the pilot control stage in particular; these are steps which, seen as a whole, contribute to a substantial improvement in the dynamic relations of the valve. With reference to the influencing variables mentioned above, the electrically controllable valves can be divided into two constructional types, one of which is to be designated as a directly electrically actuatable valve, while the second is to be designated to an indirectly electrically actuatable valve, based on valve operations. In the directly electrically actuatable valve the power for actuating the valve closing element is produced directly by an electromagnet. This means that the maximum controllable flow volumes or pressures are directly dependent on the actuating force available from the magnets. To apply this force, large-volume electromagnets with equally large coils are needed, which, in comparison to the pneumatic valve main stage, are not inferior to the latter in structural dimensioning and weight in known servo valves. Finally, the electric power consumption in servo valves of such a structural form is of such a character as can be achieved by electronic control systems only by means of, for example, the intermediary of expensive amplification switching circuits. Servo valves, in which the geometric data of a pilot control state and a valve main stage are approximately large, are accordingly not suited for integration in pneumatic drive systems. The large masses to be moved impede the degree of dynamic behavior desired for actuating drives. The limit frequency, for example, remains far below the values required in the case of application for accurate and rapid control of actuating drives in operation technology. Excessively high electric power consumption, which produces a considerable amount of heat, imposes limits on use, and either additional cooling or reduced power consumption must be provided.

In the second constructional type, designated as an indirectly electrically actuatable valve, what is involved is particularly an electropneumatic anticipatory or pilot control stage composed of a so-called pilot valve, which is actuated by the electromagnet, and which adjusts the main valve by means of pressure action of the control piston. The advantage of the electrically controllable pilot valve consists in that the contollable pressures or flow volumes are independent of the actuating force of the magnet. The necessary electric power consumption is determined here only by means of the pilot valve or coil which adjusts the latter. Although the solution employing the pilot valve poses a somewhat more costly conception, it paves the way for solving the primary problems with respect to miniaturization and improvement of the dynamic behavior. A first difficulty, still to be overcome, consists in the layout of a suitable plunger coil. This coil is limited, in a preliminary control stage of the type named above, on the one hand through the necessary force of the deflection of a diaphragm spring and, on the other hand, through the permissable current density in the plunger coil. Since the valve output is to be retained at least unchanged, and so that no reduction of the deflection force can be permitted, a general output improvement can only be attained through increased current density with correspondingly improved conduction. This consideration also meets the requirement for a geometrically small construction and can be introduced, in particular, in valves which are indirectly controllable by an electropneumatic anticipatory control stage of the type designated above.

Accordingly, the object of the invention is to provide a simple, small electropneumatic anticipatory or pilot control stage for controlling a pneumatic servo valve suitable for integration in pneumatic drives with the smallest possible dimensioning and the least power consumption and through an optimum, dynamic behavior.

In accordance with the present invention an electropneumatic pilot control stage is provided with a nozzle impact plate system for controlling a pneumatic servo valve characterized by openings arranged in a diaphragm spring disk, serving as a carrier element of a plunger coil, and in the front flange of the coil body in the axial direction relative to the arrangement of the coil and concentrically around a central impact plate surface. Further, outwardly guiding exhaust ducts are provided in the region of a cylindrical hollow space, which is formed by a peripheral, annular magnet and a central anchor peg of a T-shaped anchor, positioned on the front of the anchor. These exhaust ducts are provided in such a way that the air flowing out of a measuring nozzle into the anticipatory control stage is conducted through the magnetic interferric space or air gap past the cylindrical outer and inner surfaces of the coil, so that the coil is cooled by the working medium of the servo valve.

Based on the present invention it is possible, in an advantageous manner, to ensure a considerably improved heat removal by means of the air flow passing continuously from the measuring nozzle, and, due to the heat removal, the current can be substantially increased. By means of a selective arrangement of the openings in the diaphragm spring disk, and possibly in the flange of the coil body, the effective air flow is forcibly guided past the cylindrical outer and inner sides of the plunger coil and is uniformly distributed. The air, heated by the removal of heat from the coil, is guided through the cylindrical hollow space between the annular magnet and the anchor peg and then through several exhaust ducts in the outlet side of the automatic control stage into the atmosphere. Very effective cooling in the region of the heat radiating zone in the pilot control stage is achieved through the structural design of the pilot control stage and the steps for guiding the exhaust flow out of the measuring nozzle by making use of the working medium utilized in the valve. Without the cost of additional cooling, an unchanged valve output is achieved with a reduced power consumption. The current can be increased due to the effective heat removal, that is, the plunger coil can be made smaller with an equal control capacity. This advantage affords improved valve dynamics because of the reduced moving parts of the plunger coil. In general, the pilot control stage for the indirectly actuated pneumatic servo valve can be constructed geometrically smaller to a considerable degree through the indicated steps; and the miniaturization achieved in this way creates additional favorable conditions for integrating the designated servo valve in pneumatic drives.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
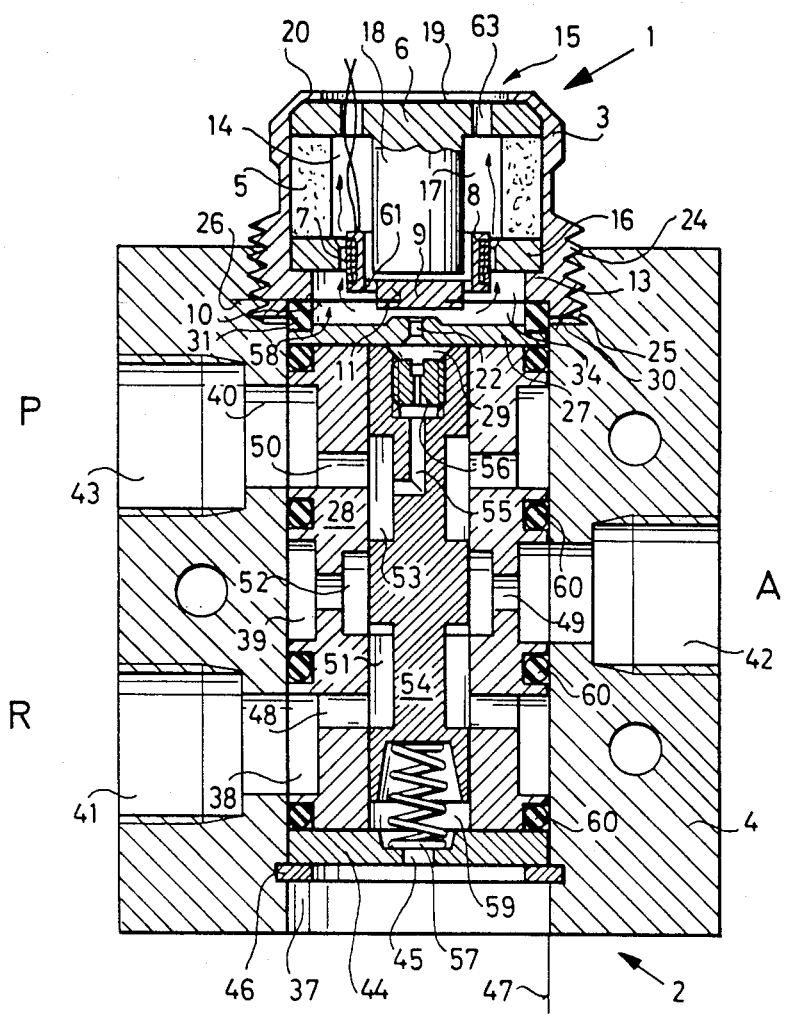
FIG. 1 is a cross-sectional view of an indirectly actuated servo valve composed of an electropneumatic pilot control stage and a valve main stage.
Figure 2:
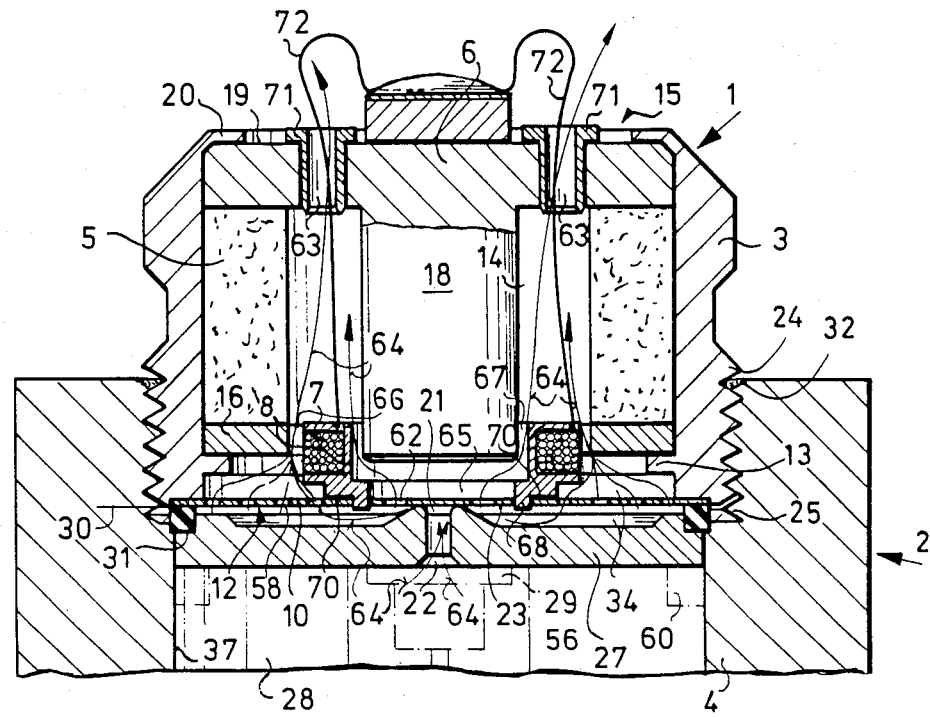
FIG. 2 is a cross-sectional view of an electropneumatic pilot control stage with a diaphragm spring disk serving as an impact plate and with openings for guiding the control air to cool the plunger coil.

One embodiment of an electropneumatic servo valve, according to the type described above, is composed of a pilot or anticipatory control stage 1 and a valve main stage 2. The automatic control valve 1 is located in a housing 3 and the valve main stage 2 is positioned in a separate housing 4. A permanent magnet 5, an anchor 6, a plunger coil 7 with a specially constructed coil body 8 and an integrated impact plate 9 are located in the housing 3 as parts of the pilot control stage 1 (FIG. 1). The coil body 8 and the impact plate 9 are carried on a diaphragm spring disk 10 with the impact plate 9 inserted in self-locking manner in a corresponding borehole 11 in the diaphragm spring disk 10, that is, by a press fit or in the form-locking manner. In the construction of the pilot control stage 1, according to FIGS. 1 and 2, an inwardly projecting collar 13 is provided in the cylindrical hollow space 14 of the pilot control stage 1 in the vicinity of the side 12, facing the valve main stage 2. This collar 13 supports an annular pole shoe 16 inserted from the end face side 15—open for that purpose—into the cylindrical hollow space 14. The next part inserted in the hollow space 14 is the annular, permanent magnet 5 followed by an anchor 6, which is T-shaped as shown in FIG. 1. The anchor peg 18 on the anchor 6 forms a closure located approximately at the lower edge of the pole shoe 16 in the inserted position. A border 20 on the housing 3 projects over the outwardly directed anchor end face 19, and is inwardly flanged and, accordingly, retains the parts inserted in the housing 3 in a fixed arrangement relative to the other function levels determined by means of the structural form of the automatic control stage 1. One of these above-mentioned function levels is formed by positioning a surface 23 of the impact plate 9 cooperating with an outlet opening 21 of a control air measuring nozzle 22. The impact plate 9, as shown in FIG. 1, is part of a one-piece coil body 8 and is, as already mentioned, received in the central borehole 11 of the disk-shaped diaphragm spring disk 10. The diaphragm spring disk 10 is held in a recess 26 in the inner wall of the housing 3. Accordingly, the currentless initial position of the plunger coil 7 is determined in the gap or space 17 of the magnetic field between the pole shoe 16 and the anchor peg 18 and the position of the effective surface 23 of the impact plate 9 is simultaneously defined with reference to the housing 3. A fine thread 24 is cut in a collar-shaped extended part of the outer wall of the housing 3 of the pilot control stage 1 for a continuous fine positioning of the pilot control stage 1 relative to the valve main stage 2 and, at the same time, as a fastening means for the connection with the valve main stem 2. By means of the fine thread 24 the complete pilot control stage 1 can be screwed into a finely threaded borehole 25 arranged on the side of the housing 4 of the valve main stage 2 forming the pilot control stage 1. Because of the characteristic of a small lead of the threads in a fine thread, the pilot control stage 1 and, here in particular, the diaphragm spring disk 10, which is positioned in close connection relative to the housing 3, can be guided on with the impact plate 9 along a relatively large turning path at the outlet opening 21 of the measuring nozzle 22 with correspondingly great accuracy.

The measuring nozzle 22 is provided in a replaceable nozzle plate 27, which can be inserted in the housing 4 and supported on a cylindrical control bush 28. To ensure that the compressed air exits from a control air space 29 exclusively via the measuring nozzle 22, an elastomer sealing element is provided, as a flexible intermediate layer, between the nozzle plate 27 and the lower edge 30 of the housing of the pilot control stage 1 in an embodiment form according to FIGS. 1 and 2. The elastomer sealing element 31 ensures—with an absolute sealing effect—an adjustability of the position of the impact plate 9 in the pilot control stage 1 relative to the measuring nozzle 22 in the valve main stage 2 in the area of a desirable working point. Because of the adjustability of the relative positions between the impact plate 9 and the measuring nozzle 22 attained by means of the fine thread 24, 25, the mounted position of the nozzle plate 27 in the housing 4 of the valve main stage 2 is, in itself, insensitive to position within sufficient limits. An accurate adjustment of the working point in individual cases is effected by screwing the pilot control stage 1 into the housing 4 of the valve main stage 2. To ensure the optimum working point adjustment and serving, at the same time, as a seal for the thread connection 24, 25 between the housings 3 and 4, an after-hardening screw safety means 32 is inserted in the threads of the fine thread 24, 25. Such a material-locking screw protection can be detached, if necessary, so that it is possible to readjust the setting of the working point between the pilot control stage 1 and the valve main stage 2 or one can replace the pilot control stage 1.

Figure 3:
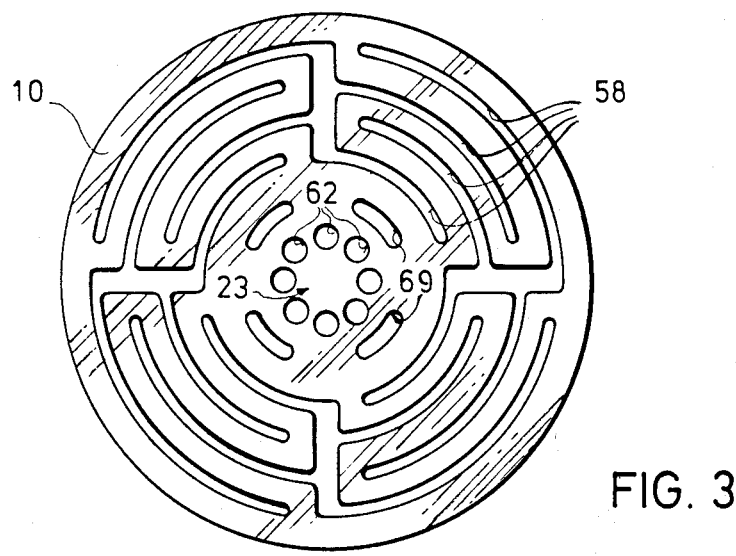
FIG. 3 is a plan view of a diaphragm spring disk with openings for distributing and guiding the air flow out of the measuring nozzle into the heat radiating area of the plunger coil, these openings are arranged concentrically relative to the position of the plunger coil.

In the mounted state, the diaphragm spring disk 10, is peripherally held between the pilot control stage 1 and the nozzle plate 27 of the valve main stage 2 and serves as a carrier element for the plunger coil 7. The disk 10 has openings 58 in its elastic intermediate zone, and these openings serve, firstly, to form the spring arms and, secondly, to guide a flow of air, note arrows 64, so as to be distributed, out of the measuring nozzle 22, through the magnetic interferric space 66, 67, past the outer and inner cylindrical surfaces of the plunger coil 7. To afford a heat removal at the inside of the plunger coil 7, additional openings 61 are provided in the front flange 65 of the coil body 8 according to FIG. 1 which guide the flow of air 64 through the coil core. In another embodiment the automatic control stage 1 shown in FIGS. 2 and 3, the diaphragm spring disk 10 is constructed, at the same time, as an impact plate 9, openings 62 are provided concentrically around an impact plate surface 23 of the diaphragm spring disk 10; a part of the flow of air 64 out of the measuring nozzle 22 is guided through the openings 62 and a flange 65, which is left open, and then through the inner space or gap 67 between the coil body 8 and the anchor peg 18. To fasten the coil body 8 it is provided with axially projecting knobs 68 which are inserted in correspondingly arranged slots 69 in the, diaphragm spring disk 10, note FIG. 3. The flow of air 64, heated by the removal of heat from the plunger coil 7, is guided into the atmosphere in an unimpeded manner through outwardly guiding exhaust ducts 63 located in the anchor 6 in the region of an annular hollow space 14. The space 14 is formed by the inner periphery of the annular magnet 5 and the surface of the anchor peg 18 on the T-shaped anchor 6. The flow of air 64 constantly passes out of the measuring nozzle 22 into an air space 34 in the pilot control stage 1 during the control process and reaches the upper half of the air space 34 through the openings 58, 61, 62 practically without resistance. From the upper half of the air space 34, the flow of air current 64 is guided through the magnetic interferric space 66, 67, over the outer and inner cylindrical surfaces of the plunger coil 7. With this arrangement a homogeneous heat removal from the area of the plunger coil 7 can be achieved by means of the working medium inherent to the servo valve. The result is that, without special expenditure, the plunger coil 7 can be loaded with an increased current density. Further, it is achieved through this arrangement, that the compressed air-cooled plunger coil 7 can be constructed smaller with respect to structural volume and weight without any reduction of the guiding force and a much improved dynamic behavior of the pilot control stage 1 can be attained because of the smaller mass involved. The cross-section of the exhaust ducts 63 are dimensioned so that there is no retroactive throttling of the flow of air 64 during the maximum exhaust flow. Protective sleeves 71, formed of an insulation material, are inserted in the exhaust ducts 63, and, in addition to the exhaust flow, the sleeves carry the connection lines 72 to the plunger coil 7 so that the lines are freely moveable.

The anticipatory or pilot control stage 1 described above represents a part of an indirectly controllable, pneumatic servo valve, whose pneumatic valve main stage 2 is composed as follows:

A cylindrical borehole 37 is provided in the housing 4 of the valve main stage 1, in which a control bush 28 is inserted. Control bush 28 has outer annular grooves 38, 39, 40 connected with boreholes 41, 42, 43 in the inserting position for attaching connecting lines. The position of the control bush 28 in the borehole 37 is provided, in part, by a closure piece 44 with a central air removal borehole 45, secured axially by a spring ring 46 in a groove 47 of the cylindrical borehole 37 in the housing 4, and on the side facing the preliminary control stage 1 by the nozzle plate 27. The nozzle plate 27 is pressed against the control bush 28 by the sealing element 31 by means of the inwardly screwed pilot control stage 1. The outer ring grooves 38, 39, 40 in the control bush 28 communicate with ring grooves 51, 53 in a control piston 54 and with an inner ring groove 52 in the control bush 28 via radially arranged boreholes 48, 49, 50. The control piston 54 is supported for movement in a cylindrical borehole 59 of the control bush 28. The control bush 28 itself is sealed against the housing 4 by means of sealing rings 60. In its function as flow control valve, borehole 43 (P), for example, serves for connecting a primary compressed air line. The secondary pressure line, or work pressure line, is connected at the borehole 42 (A). Finally, borehole 41 (R) serves to connect the exhaust line or reverse flow line. To supply the control air, the ring groove 53, constantly under the influence of primary pressure, communicates with the control air space 29 at the end of the control piston 54, which end faces the pilot control stage 1, via a control air duct 55, arranged as a central borehole in the control piston 54, and then through a control air current throttle 56. A compression spring 57, supported on the closure piece 44, counteracts the thrust force effect on the control piston 54 on the basis of a variably controllable pressure in the control air space 29. An outwardly adjustable adjusting screw, not shown, can be provided in order to adjust the compression spring force while retaining an air removal borehole 45.

In its function as a current control valve, the manner of operation of the described electropneumatic servo valve, according to FIG. 1, is explained as follows: The connection line for the primary pressure, for example, is arranged at the borehole 43 (P). The medium—air or another gas—characterized through excess pressure can not be effective as a working flow of air at the consumer terminal A, because of the position of the control piston 54, shown in FIG. 1, in the extreme upper position, since there is no communication in this position between the ring groove 53, which, in itself, constantly communicates with the supply air flow connection at the borehole 43, and the consumer terminal A. In the extreme upper position of the control piston 54, the valve main stage 2 is adjusted at a maximum cross-section of the consumer terminal near A in a reverse flow direction relative to connection R, because the ring groove 51 of the control piston 54 is positioned so as to overlap with the inner ring groove 52 in the control bush 28. In the embodiment shown, this adjustment is generally maintained as long as the conditions for a change of the position of the control piston 54, which position is adjusted by the compression spring 57, are not given by means of the application of the supply of compressed air. One can achieve a change in the position of the control piston 54 when the pressure in the control air space 29 above the control piston 54 is built up to the extent that the pressure overcomes the restoring force of the compression spring 57 as actuating force and correspondingly displaces the control piston 54, according to FIG. 1, in a downward direction. A transfer of the primary air pressure in the supply connection P into the control air space 29, which transfer is necessary for this purpose, is effected by a constant connection of the borehole 43 with the ring groove 53 via the outer ring groove 40 and radial boreholes 50 in the control bush 28. The ring groove 53 is, in turn, connected with the control air space 29 via the control air duct 55 and the control air current throttle 56. The adjustment of an air flow controllable at the consumer terminal A is effected by a corresponding positioning of the control piston 54. The control of the plunger coil 7 in proportion to the current is based on the electric input current signals. According to the movement of the plunger coil 7, the impact plate 9 is, for example, guided against the measuring nozzle 22; accordingly the outflow of control air from the control air space 29 is limited or reduced and thus produces a control pressure of, for example, 1.5 to 6 b in the control air space 29, which control pressure acts on the face of the control piston 54. Because of this variably adjustable pressure, the control piston 54 is guided against the compression spring 57 in such a way that, after achieving a determined control piston position with increasing control pressure, there takes place an overlapping (the cross-section of which overlapping is likewise adjustable) of the ring groove 53 (which ring groove 53 is under supply pressure) with the inner ring groove 52 and, accordingly, with the consumer terminal A. Before an effective connection of the supply connection P (which supply connection is under primary pressure) with the consumer terminal A, the connection between the consumer terminal at A and the reverse flow connection in R (which connection is adjusted before this at the maximum outlet cross-section) is closed. If the signal current for controlling the plunger coil 7 is withdrawn, then the relation correspondingly reverses, that is, the air flow at the consumer terminal A is correspondingly throttled and, in continuation, the connection from P to A is finally closed. After this a change-over in the connection of the consumer terminal A to the exhaust connection or reverse flow connection in R again takes place.

Substantial characterising features of the construction and manner of operation of the electropneumatic servo valve of the type indicated are to be seen in that the mechanism shown concerns a two-stage, indirect valve control composed of an electropneumatic signal converter stage or pilot control stage 1 and a valve main stage 2, which can be adjusted, independent of load. With the pilot control stage 1 as the servo device, it is possible to control indirectly the volume flow in the valve main stage 2 to an order of magnitude of, for example, 500 l/min with small electrical control currents of up to approximately 200 mA. It is very advantageous that there is a proportional relationship between the electric signal current in the plunger coil 7 and the volume flow at the consumer outlet A. Moreover, the moving, small masses of the servo valve—because of the steps provided in the pilot control stage 1, such as cooling and the reduction of the constructional form which can be achieved—are a precondition for a rapid manner of reaction. By means of a constantly effective, homogeneous cool air flow, guided directly past the heat radiating surfaces of the plunger coil 7, the current density in the plunger coil 7 can be considerably increased due to the continuous heat removal. This effect can be utilized so that the dynamics, with respect to short response time and high responsiveness, is substantially capable of improvement while retaining the core dimensions. But the heat removal can also be used so that the dimension of the plunger core are kept extremely small and correspondingly small, moving masses are achieved. An arrangement of the exhaust ducts 63 above the plunger coil 7 for conducting the air flow 64 towards the side can be effected according to the requirement of a corresponding mounting position without changing the manner of operation of the above-described steps.

We claim:

1. Electropneumatic pilot or anticipatory control stage for controlling a pneumatic servo valve for a pneumatic drive system comprising an axially extending housing having a first end and a second end spaced apart in the axial direction thereof, an annular plunger coil located in said housing adjacent the second end thereof, means in said housing adjacent the second end thereof including an impact plate for supporting said plunger coil, said plunger coil arranged to control said impact plate on the basis of the input of electrical signals, said annular plunger coil having an axis extending in the same general direction as the axis of said housing, said means forming a plurality of openings and including a coil body mounting said plunger coil, said coil body forming an opening therethrough in communication with the openings formed by said means, the openings in said means and in said coil body having axes extending in the axial direction of said housing, an axially extending annular magnet located within said housing spaced radially outwardly from said coil body and with the axis of said magnet extending in the same general direction as the axis of said housing and extending between said coil body and the first end of said housing, said magnet defining an inner axially extending hollow space, a T-shaped anchor including an axially extending anchor peg extending into said housing from the first end thereof, said anchor peg extending in the axial direction of said housing into said hollow space within said magnet, said anchor having a head located at one end of and extending transversely outwardly from said anchor peg, said head located at the first end of said housing, said peg being spaced radially inwardly from said magnet forming an axially extending open annular space therebetween, said head of said anchor having exhaust ducts extending therethrough and communicating with said open annular space, said plunger coil and coil body positioned at the end of said annular open space more remote from the first end of said housing and spaced outwardly from said peg and inwardly from said magnet forming open spaces arranged around said plunger coil, the second end of said housing arranged to receive a flow of air forming the working medium of the servo valve passing through the openings in said means and said coil body and then through the open spaces about said plunger coil for cooling said coil and then through the open annular space to and out of said housing passing through said exhaust ducts.

2. Electropneumatic pilot control stage for controlling a pneumatic servo valve for a pneumatic drive system comprising an axially extending housing having a first end and a second end spaced apart in the axial direction thereof, a plunger coil located in said housing adjacent the second end thereof, means in said housing adjacent the second end thereof including an impact plate for supporting said plunger coil, said plunger coil arranged to control said impact plate on the basis of the input of electrical signals, said plunger coil having an axis extending in the same general direction as the axis of said housing, said means forming a plurality of openings and including a coil body mounting said plunger coil, said coil body forming an opening therethrough in communication with the openings formed by said means, the openings in said means and coil body having axes extending in the axial direction of said housing, an axially extending annular magnet located within said housing with the axis of said magnet extending in the same general direction as the axis of said housing, said magnet defining an axially extending hollow space, a T-shaped anchor including an axially extending anchor peg extending into said housing from the first end thereof, said anchor peg extending in the axial direction of said housing into said hollow space within said magnet, said anchor having a head located at one end of and extending transversely of said anchor peg, said head located at the first end of said housing, said peg being spaced inwardly from said magnet forming an axially extending open annular space therebetween, said head of said anchor having exhaust ducts extending therethrough and communicating with said open annular space, said plunger coil and coil body positioned at the end of said annular open space more remote from the first end of said housing and spaced outwardly from said peg and inwardly from said magnet forming open spaces arranged around said plunger coil, the second end of said housing arranged to receive a flow of air passing through the openings in said means and said coil body and then through the open spaces about said plunger coil for cooling said coil and then through the open annular space to and out of said exhaust ducts, protective sleeves are inserted within said exhaust ducts in said anchor head, and connection lines for said plunger coil extending through said exhaust ducts to said coil.

3. Electropneumatic pilot control stage for controlling a pneumatic servo valve for a pneumatic drive system comprising an axially extending housing having a first end and a second end spaced apart in the axial direction thereof, a plunger coil located in said housing adjacent the second end thereof, means in said housing adjacent the second end thereof including an impact plate for supporting said plunger coil, said plunger coil arranged to control said impact plate on the basis of the input of electrical signals, said plunger coil having an axis extending in the same general direction as the axis of said housing, said means forming a plurality of openings and including a coil body mounting said plunger coil, said coil body forming an opening therethrough in communication with the openings formed by said means, the openings in said means and coil body having axes extending in the axial direction of said housing, an axially extending annular magnet located within said housing with the axis of said magnet extending in the same general direction as the axis of said housing, said magnet defining an axially extending hollow space, a T-shaped anchor including an axially extending anchor peg extending into said housing from the first end thereof, said anchor peg extending in the axial direction of said housing into said hollow space within said magnet, said anchor having a head located at one end of and extending transversely of said anchor peg, said head located at the first end of said housing, said peg being spaced inwardly from said magnet forming an axially extending open annular space therebetween, said head of said anchor having exhaust ducts extending therethrough and communicating with said open annular space, said plunger coil and coil body positioned at the end of said annular open space more remote from the first end of said housing and spaced outwardly from said peg and inwardly from said magnet forming open spaces arranged around said plunger coil, the second end of said housing arranged to receive a flow of air passing through the openings in said means and said coil body and then through the open spaces about said plunger coil for cooling said coil and then through the open annular space to and out of said exhaust ducts, said coil body comprises projecting knobs formed thereon, said means comprises a diaphragm spring disk having slots therein arranged to receive said knobs and said slots also arranged for the passage of air therethrough for flow around said plunger coil.

4. Electropneumatic pilot control stage as set forth in claim 3, wherein said openings in said diaphragm spring disk are arranged concentrically about the axis of said magnet in the central region of said disk for distributing the flow of air for uniform heat removal from said plunger coil.

5. Electropneumatic pilot control stage, as set forth in claim 1, including constructing said plunger coil for effecting the miniaturization of the pilot control stage by effecting the removal of heat from the surfaces of said plunger coil.

6. Electropneumatic pilot control stage for controlling a pneumatic servo valve for a pneumatic drive system comprising an axially extending housing having a first end and a second end spaced apart in the axial direction thereof, a plunger coil located in said housing adjacent the second end thereof, means in said housing adjacent the second end thereof including an impact plate for supporting said plunger coil, said plunger coil arranged to control said impact plate on the basis of the input of electrical signals, said plunger coil having an axis extending in the same general direction as the axis of said housing, said means forming a plurality of openings and including a coil body mounting said plunger coil, said coil body forming an opening therethrough in communication with the openings formed by said means, the openings in said means and coil body having axes extending in the axial direction of said housing, an axially extending annular magnet located within said housing with the axis of said magnet extending in the same general direction as the axis of said housing, said magnet defining an axially extending hollow space, a T-shaped anchor including an axially extending anchor peg extending into said housing from the first end thereof, said anchor peg extending in the axial direction of said housing into said hollow space within said magnet, said anchor having a head located at one end of and extending transversely of said anchor peg, said head located at the first end of said housing, said peg being spaced inwardly from said magnet forming an axially extending open annular space therebetween, said head of said anchor having exhaust ducts extending therethrough and communicating with said open annular space, said plunger coil and coil body positioned at the end of said annular open space more remote from the first end of said housing and spaced outwardly from said peg and inwardly from said magnet forming open spaces arranged around said plunger coil, the second end of said housing arranged to receive a flow of air passing through the openings in said means and said coil body and then through the open spaces about said plunger coil for cooling said coil and then through the open annular space to and out of said exhaust ducts, said means includes a diaphragm spring disk located adjacent the second end of said housing, said diaphragm spring disk supports said impact plate, and the openings formed by said means are located in said diaphragm disk support.

7. Electropneumatic pilot control stage, as set forth in claim 6, wherein said diaphragm spring disk supports said coil body.

8. Electropneumatic pilot control stage, as set forth in claim 6, wherein said impact plate is inserted in a form-locking manner in said diaphragm spring disk.

9. Electropneumatic pilot control stage for controlling a pneumatic servo valve for a pneumatic drive system comprising an axially extending housing having a first end and a second end spaced apart in the axial direction thereof, a plunger coil located in said housing adjacent the second end thereof, means in said housing adjacent the second end thereof including an impact plate for supporting said plunger coil, said plunger coil arranged to control said impact plate on the basis of the input of electrical signals, said plunger coil having an axis extending in the same general direction as the axis of said housing, said means forming a plurality of openings and including a coil body mounting said plunger coil, said coil body forming an opening therethrough in communication with the openings formed by said means, the openings in said means and coil body having axes extending in the axial direction of said housing, an axially extending annular magnet located within said housing with the axis of said magnet extending in the same general direction as the axis of said housing, said magnet defining an axially extending hollow space, a T-shaped anchor including an axially extending anchor peg extending into said housing from the first end thereof, said anchor peg extending in the axial direction of said housing into said hollow space within said magnet, said anchor having a head located at one end of and extending transversely of said anchor peg, said head located at the first end of said housing, said peg being spaced inwardly from said magnet forming an axially extending open annular space therebetween, said head of said anchor having exhaust ducts extending therethrough and communicating with said open annular space, said plunger coil and coil body positioned at the end of said annular open space more remote from the first end of said housing and spaced outwardly from said peg and inwardly from said magnet forming open spaces arranged around said plunger coil, the second end of said housing arranged to receive a flow of air passing through the openings in said means and said coil body and then through the open spaces about said plunger coil for cooling said coil and then through the open annular space to and out of said exhaust ducts, said impact plate comprises a diaphragm spring disk having an impact plate surface with the openings formed by said means located in said diaphragm spring disk concentrically about said impact plate surface.

* * * * *